United States Patent
Lee et al.

(10) Patent No.: US 6,396,574 B1
(45) Date of Patent: May 28, 2002

(54) APPARATUS FOR MEASURING THE WAVELENGTH, OPTICAL POWER AND OPTICAL SIGNAL-TO-NOISE RATIO OF EACH OPTICAL SIGNAL IN WAVELENGTH-DIVISION MULTIPLEXING OPTICAL COMMUNICATION

(75) Inventors: Chang Hee Lee, Taejun; Sang Yung Shin, Seoul; Kwang Uk Chu, Taejun, all of (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/524,156

(22) Filed: Mar. 14, 2000

(30) Foreign Application Priority Data

Mar. 15, 1999 (KR) .............................. 99-8593
Aug. 20, 1999 (KR) ............................ 99-34512

(51) Int. Cl.[7] .............................. G01N 21/00
(52) U.S. Cl. .................................. 356/73.1
(58) Field of Search ................. 356/73.1; 385/15, 385/27, 24; 359/109, 114, 115, 124, 136

(56) References Cited

U.S. PATENT DOCUMENTS 5,796,479 A 8/1998 Derickson et al.

OTHER PUBLICATIONS

C. Koeppen et al., "High Resolution Fiber Grating Optical Network Monitor," National Fiber Optic Engineers Conference '98, Sep. 14–17, 1998.

Otsuka, K., et al., "A High–Performance Optical Spectrum Monitor with High–Speed Measuring Time for WDM Optical Networks" ECOC 97, Sep. 22–25, 1997, Conference Publication No. 448, pp. 147–150.

Primary Examiner—Frank G. Font
Assistant Examiner—Tu T. Nguyen
(74) Attorney, Agent, or Firm—Akin, Gump, Strauss, Hauer & Feld, L.L.P.

(57) ABSTRACT

An apparatus for measuring the wavelength, optical power, and an optical signal-to-noise ratio (OSNR) of each optical signal in wavelength-division-multiplexing optical communication includes: elements for splitting a part of wavelength-division-multiplexed (WDM) signals, elements for amplifying the WDM signals and generating spontaneous emission light simultaneously, elements for reflecting a predetermined section of the spontaneous emission light and generating an optical reference signal, and elements for combining the optical reference signal with the part of the WDM signals split by the splitting elements and generating a combined light. The apparatus has components for filtering the combined light at a fixed temperature and generating a waveform which is the same as an optical spectrum of the combined light in the time domain. The apparatus includes elements for converting the waveform into an electrical signal and components for signal processing that measure the wavelength, the optical power, and the OSNR of the WDM signals.

18 Claims, 10 Drawing Sheets

*Prior Art*

FIG. 1

OPTICAL SIGNAL-TO-NOISE RATIO = $\dfrac{\text{OPTICAL POWER OF OPTICAL SIGNAL}}{\text{NOISE POWER OF OPTICAL SIGNAL}}$

Prior Art
FIG. 3A

*Prior Art*

APPARATUS FOR MEASURING THE WAVELENGTH, OPTICAL POWER AND OPTICAL SIGNAL-TO-NOISE RATIO OF EACH OPTICAL SIGNAL IN WAVELENGTH-DIVISION MULTIPLEXING OPTICAL COMMUNICATION

TECHNICAL FIELD

The present invention relates to an apparatus for measuring the wavelength, optical power, and optical signal-to-noise ratio (OSNR) of each optical signal in wavelength-division multiplexing (WDM) optical communication using optical reference signals for reference wavelengths and an optical tunable band-pass filter.

BACKGROUND OF THE INVENTION

WDM technologies allow many optical signals with different wavelengths to travel together along a single fiber and increase the transmission capacity. To use such WDM technologies in communication, the wavelength, optical power, and OSNR of each optical signal should be measured for the communication administration.

Figure 1:
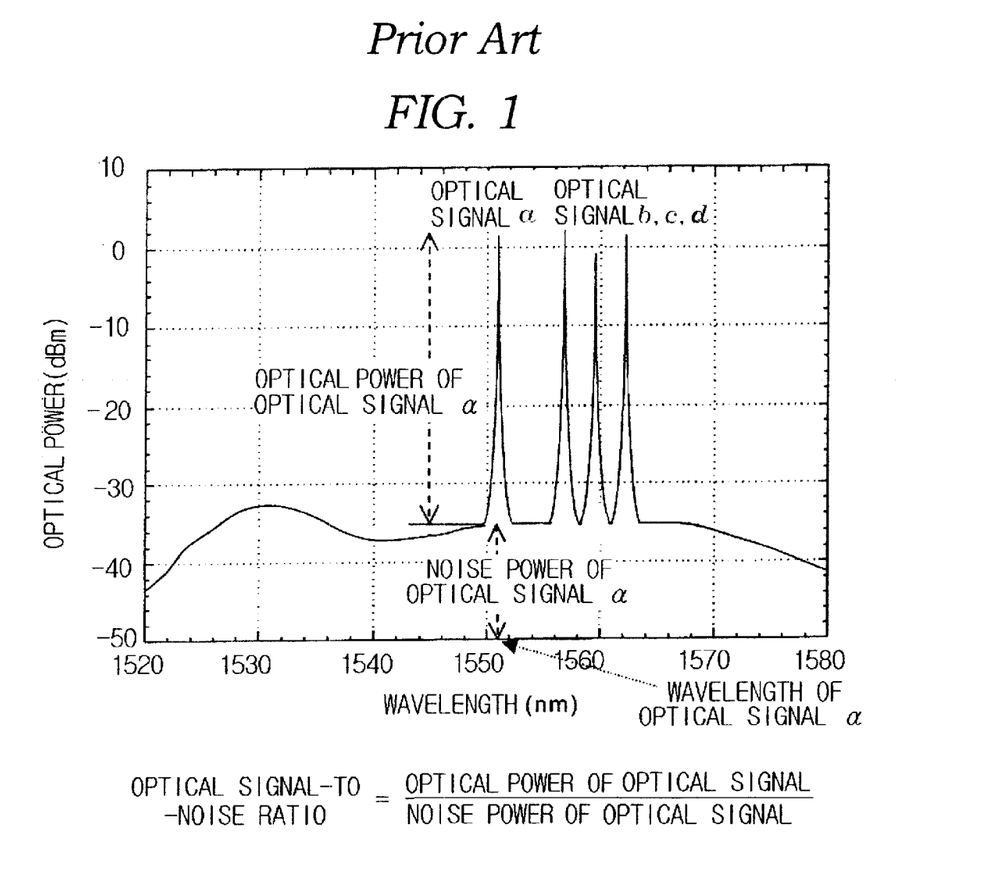
FIG. 1 is a screen image of the optical spectrum illustrating the wavelengths, optical powers, and OSNRs of optical signals a, b, c, and d when measuring them by a conventional optical spectrum analyzer.

FIG. 1 is a screen image of the optical spectrum illustrating the wavelengths, optical powers, and OSNRs of four optical signals when we measure optical signals a, b, c, and d by a conventional optical spectrum analyzer. The conventional optical spectrum analyzer has a rotating diffraction grating and a fixed photo-diode to measure the wavelength, optical power, and OSNR. In conventional methods, the optical power and OSNR of each optical signal is measured by using the photo-diode in the optical spectrum analyzer. In addition, the OSNR of optical signal is defined as the ratio of its optical power to its noise power.

Although such an optical spectrum analyzer has advantages of wide range and precision measurement, it is bulky and mechanically unstable.

To compensate these drawbacks, three methods were proposed.

Figure 2:
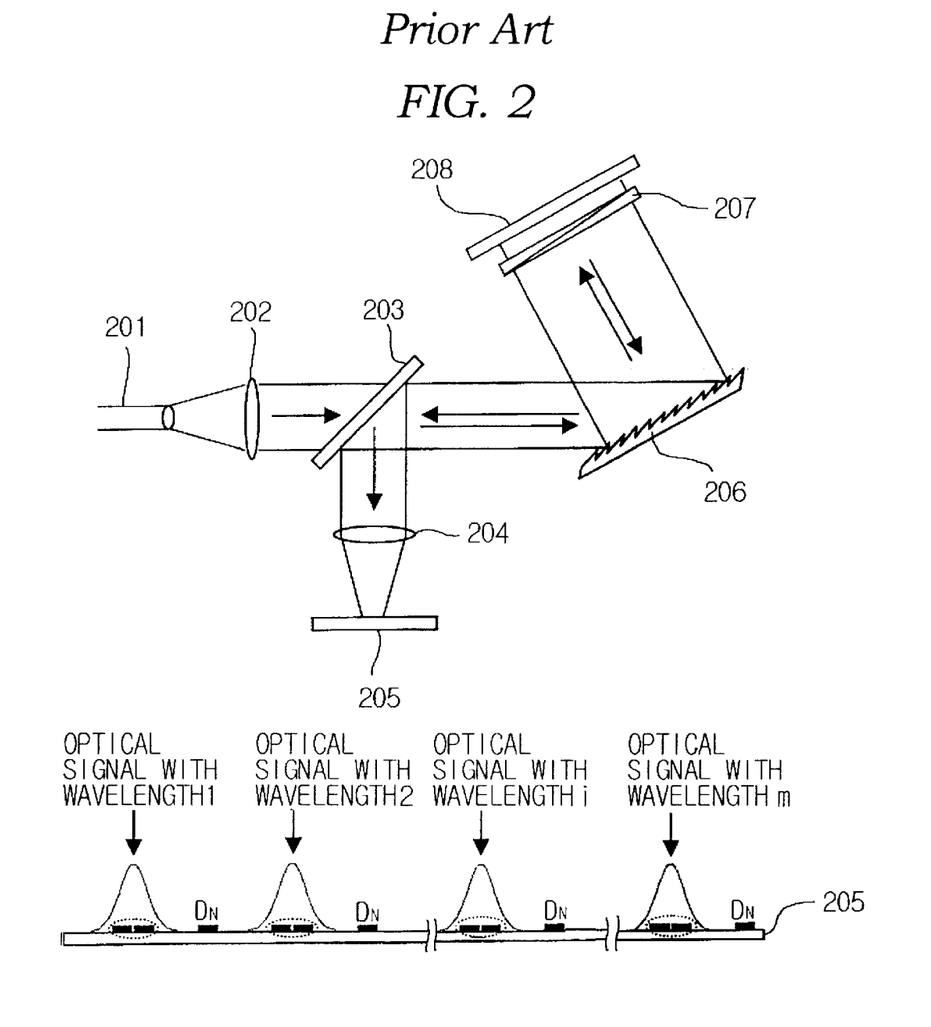
FIG. 2 is a diagram illustrating an apparatus with a fixed diffraction grating and a separate photodiode array for measuring the wavelength, optical power, and OSNR of each optical signal in WDM optical communication according to the conventional methods.

FIG. 2 is a diagram illustrating an apparatus using a fixed diffraction grating 206 and a separate photo-diode array 205 for the measurement. This method was disclosed by U.S. Pat. No. 5,796,479, "Signal Monitoring apparatus for Wavelength Division Multiplexed Optical Communication", D. Derickson, R. L. Jungerman.

Wavelength-division-multiplexed optical signals are supplied from the optical fiber 201 and collimated by the lens 202. The halves of the collimated optical signals go through the half mirror 203 and then are diffracted by the fixed diffraction grating 206. The optical signals diffracted by the diffraction grating 206 go through the polarization compensator 207 to reduce the polarization dependence of the measurement. Then, all of the optical signals are reflected upon the flat mirror 208 and go through the polarization compensator 207 again. The diffraction grating 206 diffracts the optical signals again. The halves of the diffracted wavelength-division optical signals are reflected right angle by the half mirror 203 and focused to the photo-diode array 205 by the lens 204.

The photo-diode array 205 consists of separated photo-diodes. The separated photo-diodes are a pair of the photo-diodes that are slightly separated. Each of them is spatially located at the position where the optical signal with the wavelength of ITU-T standard grid is irradiated.

Accordingly, if the wavelength of the irradiated optical signal is the same as ITU-T standard grid, the electric outputs of the separated photo-diodes are equal. However, if the wavelength of the irradiated optical signal is not the same as ITU-T standard grid, the electric outputs of the separated photo-diodes are not equal. Consequently, the wavelength of each of the wavelength-division-multiplexed signals can be estimated on the basis of ratio of the electric outputs.

The optical power of each optical signal is measured by using the total power of the separated photo-diodes. In addition, the optical power measured by the photo-diode of DN, located between the separated photo-diodes as shown in FIG. 2, is used to approximate its noise power. However, this conventional method is disadvantageous in that the optical fiber 201, the diffraction grating 206, and the photo-diode array 205 must be exactly aligned in free space.

Figure 3A:
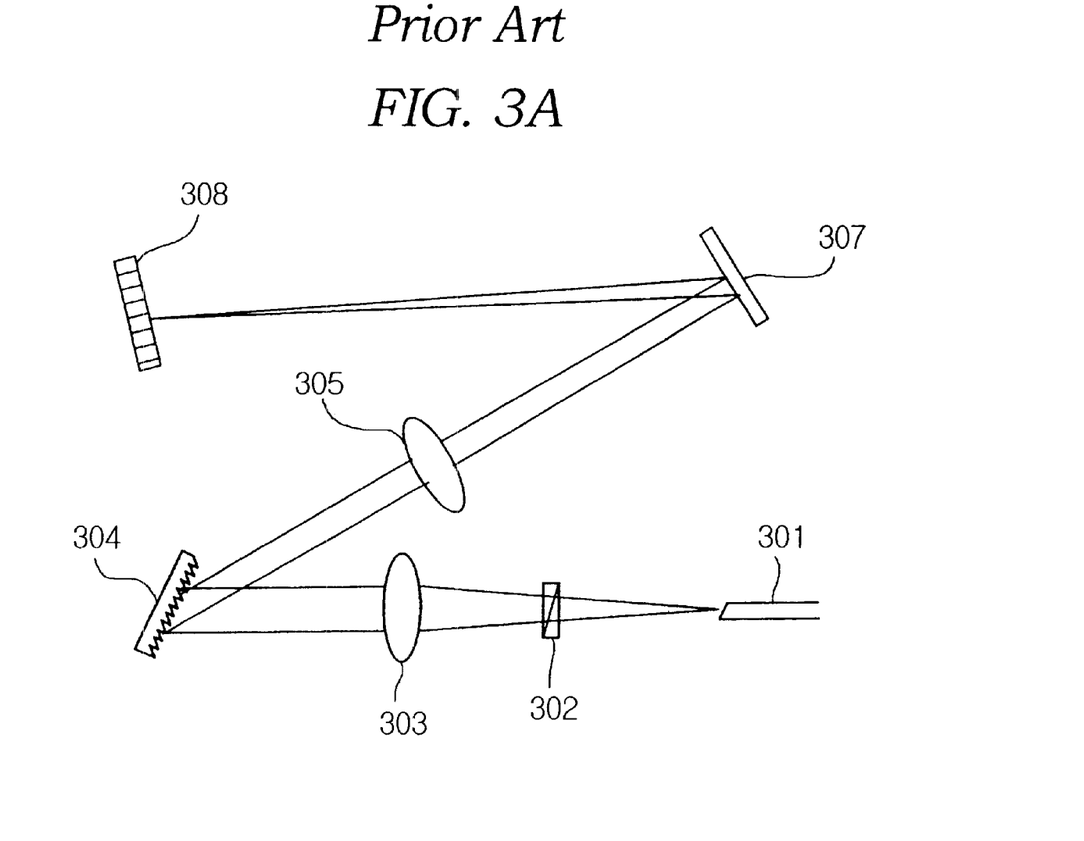
FIG. 3A is a diagram illustrating an apparatus with a fixed diffraction grating and a photo-diode array for measuring the wavelength, optical power, and OSNR of each optical signal in a WDM optical communication according to the conventional methods.

FIG. 3A is a diagram illustrating an apparatus with a fixed diffraction grating and a photo-diode array for measuring the wavelength, optical power, and OSNR of each optical signal in WDM optical communication according to conventional methods. This method was disclosed by "A high-performance optical spectrum monitor with high-speed measuring time for WDM", K. Otsuka et al. at 1997 European Conference on Optical Communication.

Wavelength-division-multiplexed signals supplied by optical fiber 301 are polarization-compensated at polarization compensator 302. The compensated signals are collimated by a lens 303 and diffracted by the fixed diffraction grating 304. The diffracted signals are focused by a lens 305 and flat mirror 307 and irradiated to the photo-diode array 308.

Figure 3B:
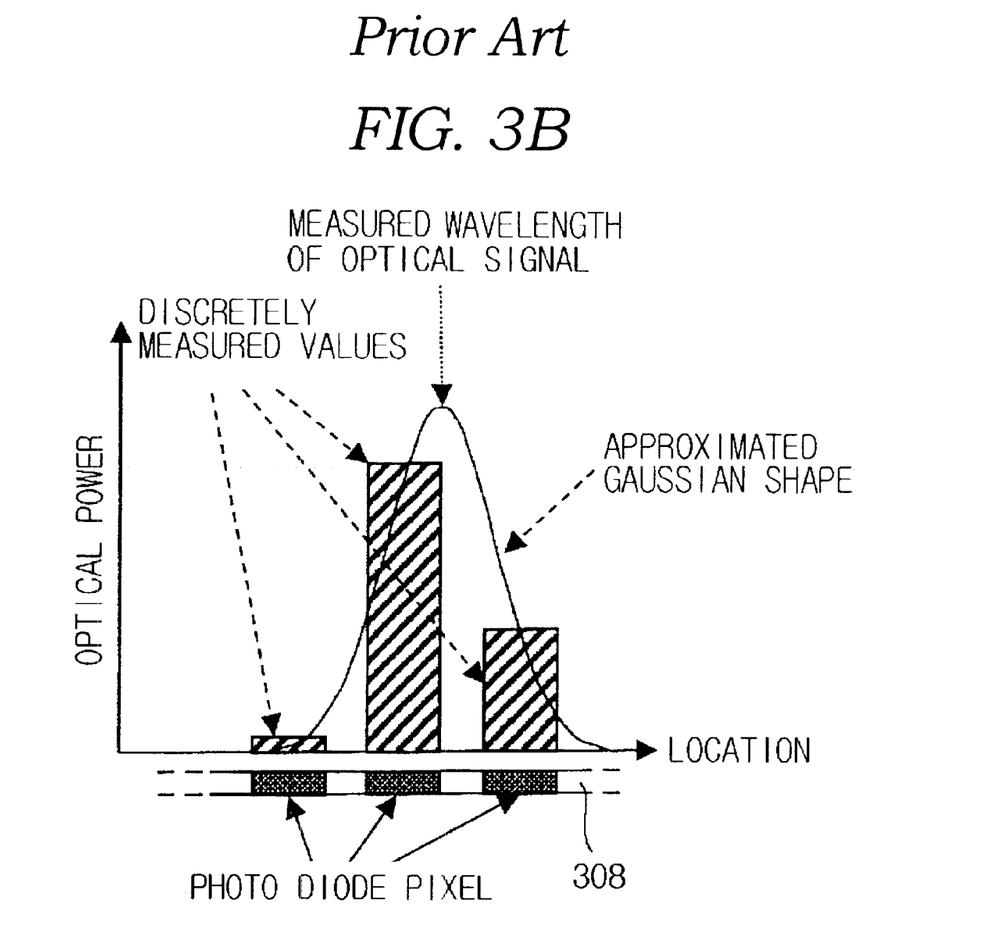
FIG. 3B is a graph illustrating Gaussian approximation for spatially discrete measurement using the apparatus with a fixed diffraction grating and a photodiode array in FIG. 3A.

In this apparatus, the wavelength, optical power, and OSNR of each of the wavelength-division-multiplexed signals are obtained on the basis of Gaussian approximation using the result of spatially discrete measurement. FIG. 3B shows an example of Gaussian approximation, which is based on discrete values measured by the photo-diode in FIG. 3A.

Same process is applied to other optical signals of different wavelengths.

However, as illustrated at FIG. 3a, the optical fiber 301, the diffraction grating 304, and the photo-diode array 308 are spatially separated and therefore complicated free-space alignment among those devices is required for accurate measurement. Also, Gaussian approximation is an overhead.

Figure 4:
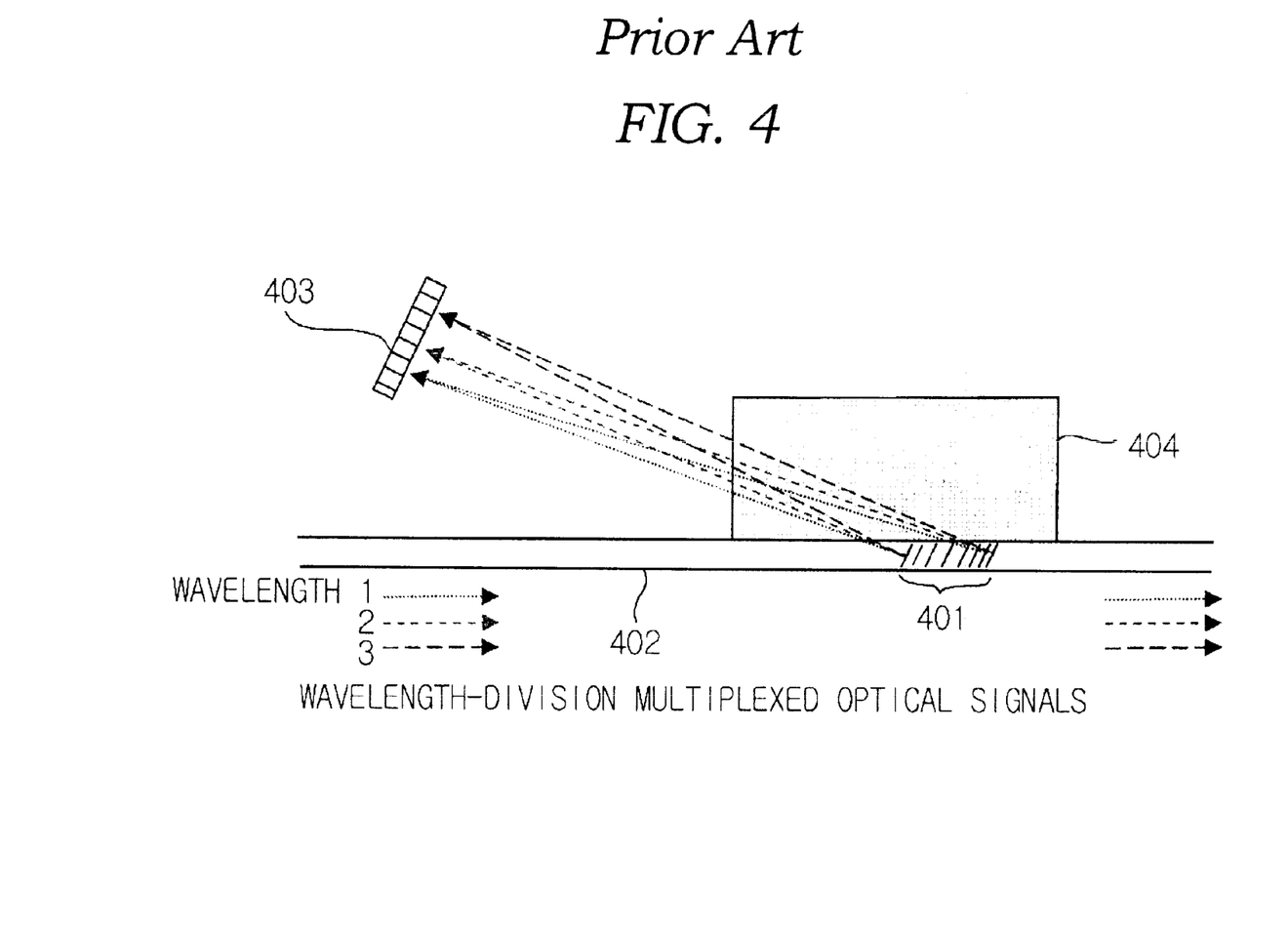
FIG. 4 is a diagram illustrating an apparatus with a blazed bragg grating for measuring the wavelength, optical power, and OSNR of each optical signal in WDM optical communication according to the conventional methods.

FIG. 4 is a diagram illustrating an apparatus with a blazed bragg grating for measuring the wavelength, optical power, and OSNR of each optical signal in WDM optical communication according to the conventional methods. This method was disclosed by "High Resolution Fiber Grating Optical Network Monitor", Chris Koeppen et al. at National Fiber Optic Engineers Conference 1998.

A blazed bragg grating 401 is inscribed on optical fiber 402. A part of wavelength-division-multiplexed signals are reflected on the blazed bragg grating 401 and irradiated to the photo-diode array 403 through the glass block 404. The methods for measuring the wavelength, optical power, and OSNR of each optical signal are the same as those of the apparatus shown in FIG. 3A.

However, the photo-diode array and the blazed bragg grating are spatially separated and therefore complicated free-space alignment among those devices is required for accurate measurement.

SUMMARY OF THE INVENTION

An apparatus for measuring the wavelength and optical power and optical signal-to-noise ratio of each optical signal in WDM optical communication is provided.

The apparatus includes the following means. The splitting means splits a part of wavelength-division-multiplexed optical signals. The amplifying means amplifies said wavelength-division-multiplexed optical signals and generates spontaneous emission light simultaneously. The reflection means reflects a predetermined section of said spontaneous emission light and generates an optical reference signal for reference wavelength. The combining means combines said optical reference signal with said wavelength-division-multiplexed signals and generates the combined light. The wavelength-division-multiplexed signals are split by said splitting means. The filtering means filters said combined light at fixed temperature and generates the same waveform as the optical spectrum of said combined light in time domain. The converting means converts said waveform into an electric signal. And, the signal-processing means measures said wavelength, said optical power, and said optical signal-to-noise ratio of each of said wavelength-division-multiplexed optical signals by employing said electric signal.

Preferably, the apparatus further includes signal-generating means for generating control signal. The control signal controls said filtering means and said signal-processing means.

Preferably, the apparatus further includes optically isolating means for passing the optical signal passing through said reflecting means in uni-direction.

An apparatus for measuring the wavelength and optical power and OSNR of each optical signal in WDM optical communication according to another embodiment of the present invention is provided.

The apparatus includes the following means. The splitting means splits a part of wavelength-division-multiplexed optical signals. A spontaneous emission light source generates spontaneous emission light. The reflecting means reflects a predetermined section of said spontaneous emission light and generates an optical reference signal for reference wavelength. The combining means combines said optical reference signal with wavelength-division-multiplexed signals and generates the combined light. The wavelength-division-multiplexed signals are split by said splitting means. The filtering means filters said combined light at fixed temperature and generates the same waveform as the optical spectrum of said combined light in time domain. The converting means converts said waveform into an electric signal. And, The signal-processing means measures said wavelength, said optical power, and said optical signal-to-noise ratio of each of said wavelength-division-multiplexed optical signals by employing said electric signal.

Preferably, the apparatus further includes signal-generating means for generating control signal. The control signal controls said filtering means and said signal-processing means.

Preferably, the apparatus further includes optically terminating means for terminating spontaneous emission light without any reflection of said spontaneous emission light passing through said means for reflecting.

More preferably, the spontaneous emission light source is a light-emitting diode (LED).

More preferably, the optical reference signal is discerned by applying a driving current into said LED, which is composed of a constant current and an alternating current with specific frequency.

An apparatus for measuring the wavelength and optical power and OSNR of each optical signal in WDM optical communication according to another embodiment of the present invention is provided.

The apparatus includes the following means. The amplifying means amplifies wavelength-division-multiplexed optical signals and generates spontaneous emission light simultaneously. The reflecting means reflects a predetermined portion of spontaneous emission light and generates an optical reference signal for reference wavelength. The combining means combines said optical reference signal with said wavelength-division-multiplexed signals and generates the combined light. The wavelength-division-multiplexed signals pass through said reflecting means. The filtering means filters said combined light at fixed temperature and generates the same waveform as the optical spectrum of said combined light in time domain. The converting means converts said waveform into an electric signal. And, signal-processing means measures said wavelength, said optical power, and said OSNR of each of said wavelength-division-multiplexed optical signals by employing said electric signal.

Preferably, the apparatus further includes signal-generating means for generating control signal. The control signal controls said filtering means and said signal-processing means.

Preferably, the amplifying means is one of an erbium-doped fiber amplifier and a semiconductor optical amplifier.

Preferably, the reflecting means is one of a fiber bragg grating and an integrated optical device including grating.

Preferably, the filtering means is one of a tunable Fabry-Perot filter, an integrated optical device including grating, and a multi-layer thin film device.

BRIEF DESCRIPTION OF THE DRAWINGS

The embodiments of the present invention will be explained with reference to the accompanying drawings, in which.

DETAILED DESCRIPTION OF THE INVENTION

Figure 5:
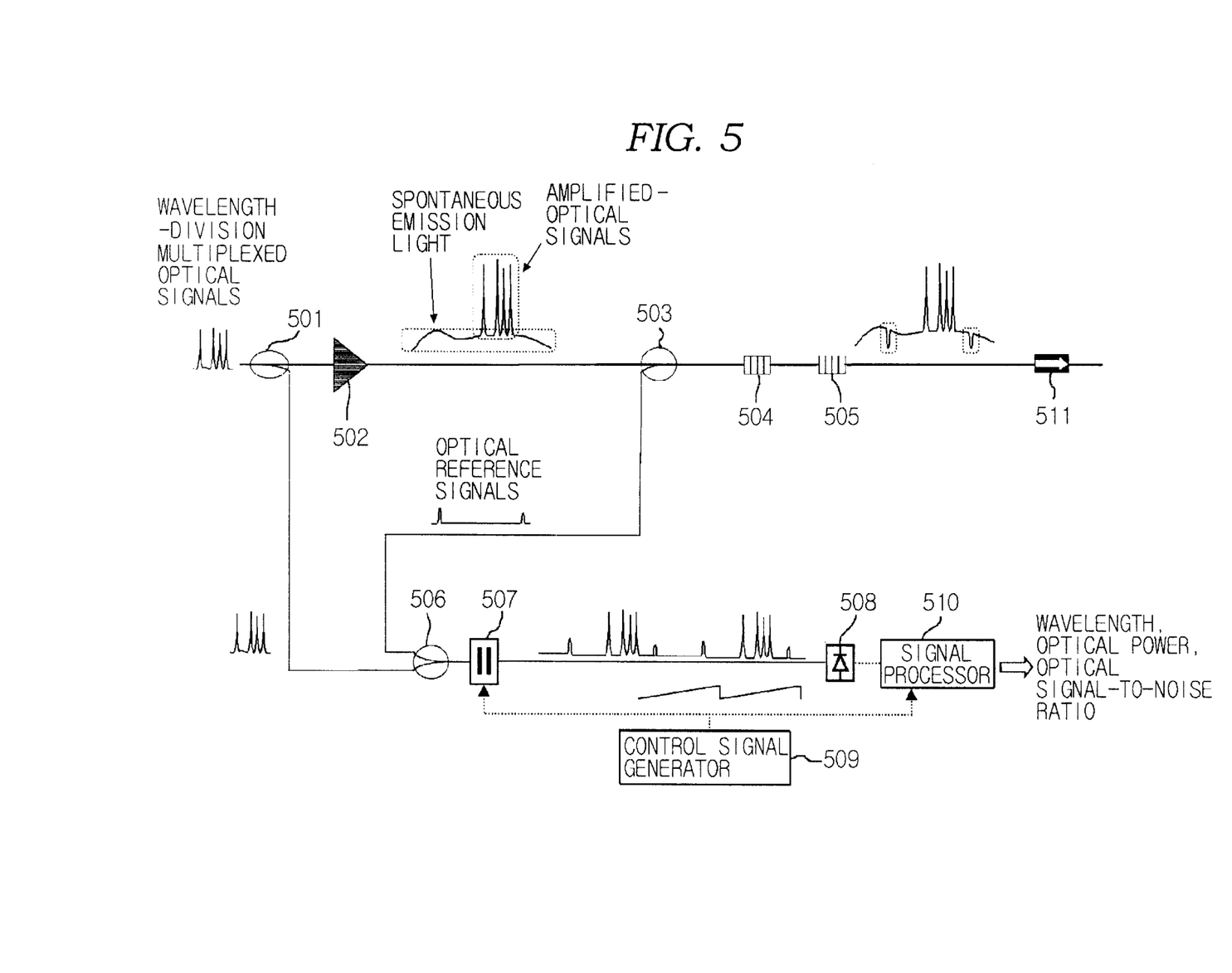
FIG. 5 is a diagram illustrating an apparatus for measuring the wavelength, optical power, and OSNR of each optical signal in WDM optical communication according to the first embodiment of the present invention.

FIG. 5 is a diagram illustrating an apparatus for measuring the wavelength, optical power, and OSNR of each optical signal in WDM optical communication according to the first embodiment of the present invention.

The apparatus includes two 2×1 optical couplers 503, 506, an 1×2 optical coupler 501, two fiber bragg gratings 504, 505, an optical isolator 511, an optical bandpass tunable filter 507, a photo-diode 508, a signal processor 510, an optical amplifier 502, and a control signal generator 509.

Each of the fiber bragg gratings 504, 505 reflects only the light at the specific wavelength that is determined by its own grating period.

The optical amplifier 502 is an erbium-doped fiber amplifier or a semiconductor optical amplifier. Besides the fiber bragg grating, an integrated optical device with grating can be used as a reflecting device.

A Tunable Fabry-Perot filter, an integrated optical device including grating, or a multi-layer thin film device implements the optical bandpass tunable filter 507.

The apparatus according to the first embodiment of the present invention operates as follows.

A part of wavelength-division-multiplexed optical signals are split by the 1×2 optical coupler 501 and supplied to the 2×1 optical coupler 506. The optical amplifier 502 amplifies the optical signals that are not split by the 1×2 optical coupler 501 and generates spontaneous emission light simultaneously. Both of the amplified signals and spontaneous emission light are supplied to the concatenated fiber bragg gratings 504, 505 through the 2×1 optical coupler 503. As the reflection wavelength of each of fiber bragg gratings 504, 505 is predetermined to be outside the wavelengths of said wavelength-division-multiplexed optical signals, only the section of spontaneous emission light at the same wavelength as the reflection wavelength of each fiber bragg grating is reflected backward. Since the reflected light has the same wavelength as that of the fiber bragg grating, it can be used as the optical reference signal for reference wavelength in wavelength measurement.

The optical signals passing through fiber bragg gratings 504, 505 are supplied to the optical isolator 511. Since the optical isolator 511 passes optical signals in uni-direction, errors caused by Rayleigh back scattering or optical reflection at non-continuous points can be prevented.

The optical reference signals reflected by the fiber bragg gratings 504, 505 are split by the 2×1 optical coupler 503 and sent to the 2×1 optical coupler 506. The 2×1 optical coupler 506 combines said optical reference signals with said wavelength-division-multiplexed optical signals in asymmetric coupling ratio to make the optical reference signals remarkable in optical spectrum, and sends the combined light to the optical bandpass tunable filter 507. The wavelength-division-multiplexed optical signals are the signals split by the 1×2 optical coupler 501.

Passband of the optical bandpass tunable filter 507 is controlled by the control signal issued from the control signal generator 509. The passband of the optical bandpass tunable filter in the embodiment of the present invention gets increasing in proportion to the amplitude of the control signal. The control signal generator 509 sends the control signal of ramp shape to the optical bandpass tunable filter 507. Consequently, the optical bandpass tunable filter 507 generates the same waveform as the optical spectrum of the combined light in which said optical reference signals generated by fiber bragg gratings 504, 505 and said wavelength-division-multiplexed optical signals are included. The photo-diode 508 converts said waveform into an electric signal.

The output electric signal of the photo-diode 508 and the control signal of ramp shape are sent to the signal processor 510. The signal processor 510 measures the optical power and OSNR of each of the wavelength-division-multiplexed optical signals by using the conventional methods.

To measure the wavelength of each of the wavelength-division-multiplexed optical signals, the signal processor 510 discerns the optical reference signals in said waveform. Since the optical spectrum shapes of said optical reference signals are determined by the optical spectrum of spontaneous emission light of the optical amplifier 502 and reflection characteristics of the fiber bragg gratings 504, 505, the optical reference signals are easily discerned by analyzing the waveform converted by said photo-diode.

Since the wavelengths of the optical reference signals are the same as the reflection wavelengths of the fiber bragg gratings, the wavelength of each optical signal is measured on the basis of the location information of the optical signals and the optical reference signals in time domain.

Figure 6:
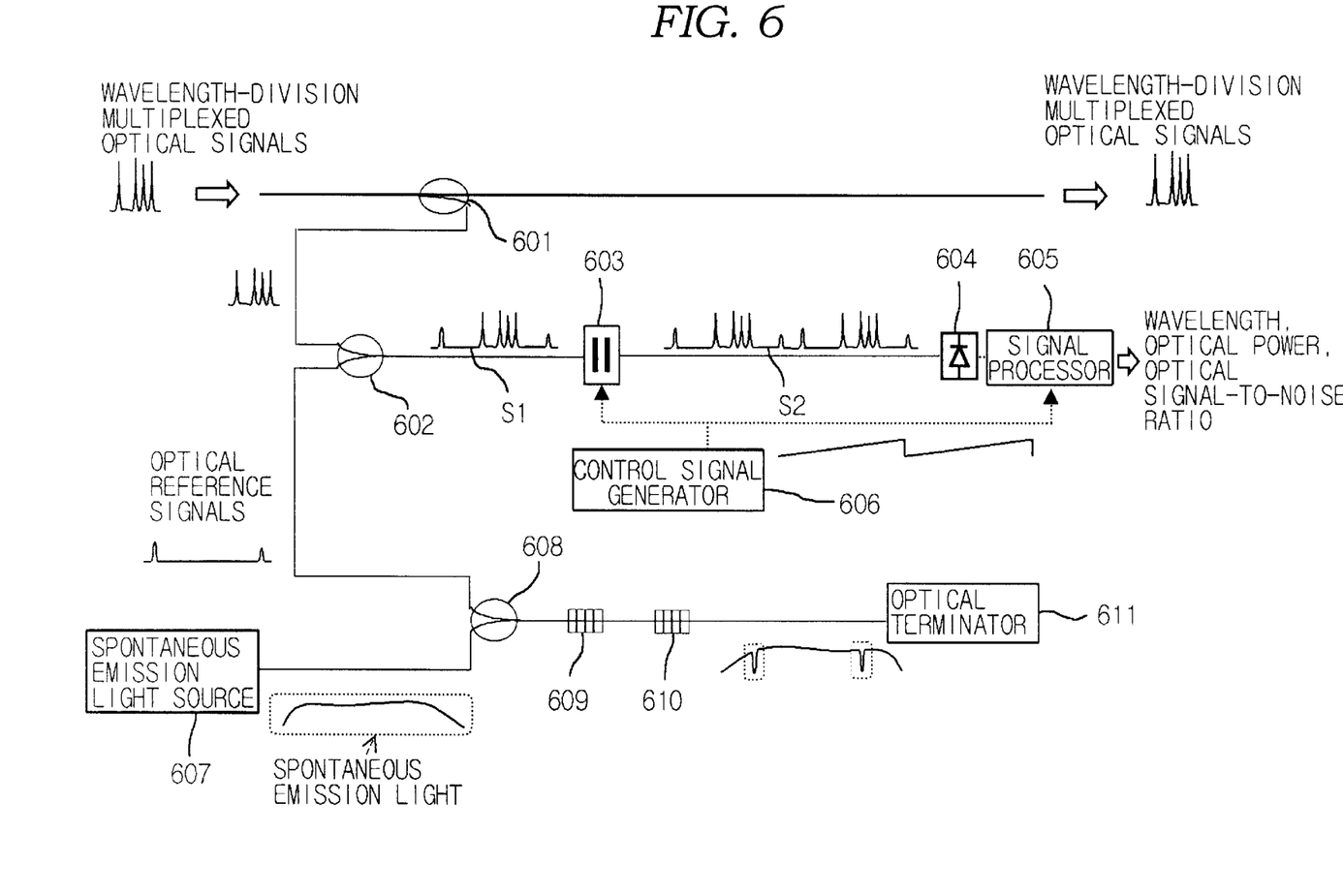
FIG. 6 is a diagram illustrating an apparatus for measuring the wavelength, optical power, and OSNR of each optical signal in WDM optical communication according to the second embodiment of the present invention.

FIG. 6 is a diagram illustrating an apparatus for measuring the wavelength, optical power, and OSNR of each optical signal in WDM optical communication according to the second embodiment of the present invention.

The apparatus includes an 1×2 optical coupler 601, two 2×1 optical couplers 602, 608, two fiber bragg gratings 609, 610, an optical terminator 611, a spontaneous emission light source 607, an optical bandpass tunable filter 603, a photo-diode 604, a signal processor 605, and a control signal generator 606.

Each of the fiber bragg gratings 609, 610 reflects only the light at the specific wavelength that is determined by its own grating period.

The apparatus according to the second embodiment of the present invention operates as follows.

First, a part of wavelength-division-multiplexed optical signals are split by the 1×2 optical coupler 601 and supplied to the 2×1 optical coupler 602. Meanwhile, a spontaneous emission light source 607 generates the broadband spontaneous emission light whose optical spectrum is roughly shown within FIG. 6.

The spontaneous emission light is supplied to the concatenated fiber bragg gratings 609, 610 through the 2×1 optical coupler 608.

As the reflection wavelength by each of fiber bragg gratings 609, 610 is predetermined to be outside the wavelengths of said wavelength-division-multiplexed optical signals, only the section of spontaneous emission light at the same wavelength as the reflection wavelength of each fiber bragg grating is reflected backward.

Because the optical terminator absolutely does not reflect any optical signal, spontaneous emission light passing through fiber bragg gratings 609, 610 is terminated at the optical terminator 611 and only the spontaneous emission signals for wavelength optical reference are generated.

Since the reflected light has the same wavelength as that of the fiber bragg grating, it can be used as the optical reference signal for reference wavelength in wavelength measurement.

The optical reference signals generated by the fiber bragg gratings 609, 610 are split by the 2×1 optical coupler 608 and sent to the 2×1 optical coupler 602.

The 2×1 optical coupler 602 combines said optical reference signals with said wavelength-division-multiplexed optical signals in asymmetric coupling ratio to make the optical reference signals remarkable in optical spectrum, and sends the combined light to the optical bandpass tunable filter 603. The wavelength-division-multiplexed optical signals are split by the 1×2 optical coupler 601.

Passband of the optical bandpass tunable filter 603 is controlled by the control signal issued from the control signal generator 606. The passband of the optical bandpass tunable filter in the embodiment of the present invention gets increasing in proportion to the amplitude of the control signal. The control signal generator 606 sends control signals of ramp shape to the optical bandpass tunable filter 603. Consequently, the optical bandpass tunable filter 603 generates the same waveform as the optical spectrum of the combined light in which the optical reference signals and said wavelength-division-multiplexed signals are included. The wavelength-division-multiplexed signals are split by the 1×2 optical coupler 601. The photo-diode 604 converts said waveform into an electric signal.

The output electric signal of the photo-diode 604 and the control signal of ramp shape are sent to the signal processor 605. The signal processor 605 measures the optical power and OSNR of each of the wavelength-division-multiplexed optical signals by using the conventional methods.

To measure the wavelength of each of the wavelength-division-multiplexed optical signals, the signal processor 605 discerns the optical reference signals in said waveform.

Since the optical spectrum shapes of said optical reference signals are determined by the optical spectrum of the spontaneous emission light of the spontaneous emission light source 607 and reflection characteristics of the fiber bragg gratings 609, 610, the optical reference signals are easily discerned by analyzing the waveform converted by said photo-diode.

Since the wavelengths of the optical reference signals are the same as the reflection wavelengths of the fiber bragg gratings, the wavelength of each optical signal is measured on the basis of the location information of the optical signals and the optical reference signals in time domain.

Another method of discerning the optical reference signal is to modulating the optical power of the spontaneous emission light.

For example, an LED is used as the spontaneous emission light source. The driving current that is composed of a constant current and an alternating current with specific frequency is applied to the LED. Then the optical power of the optical reference signal reflected by the fiber bragg grating is modulated at the same frequency as the driving current of the LED. Consequently, the optical reference signal is easily discerned.

Figure 7:
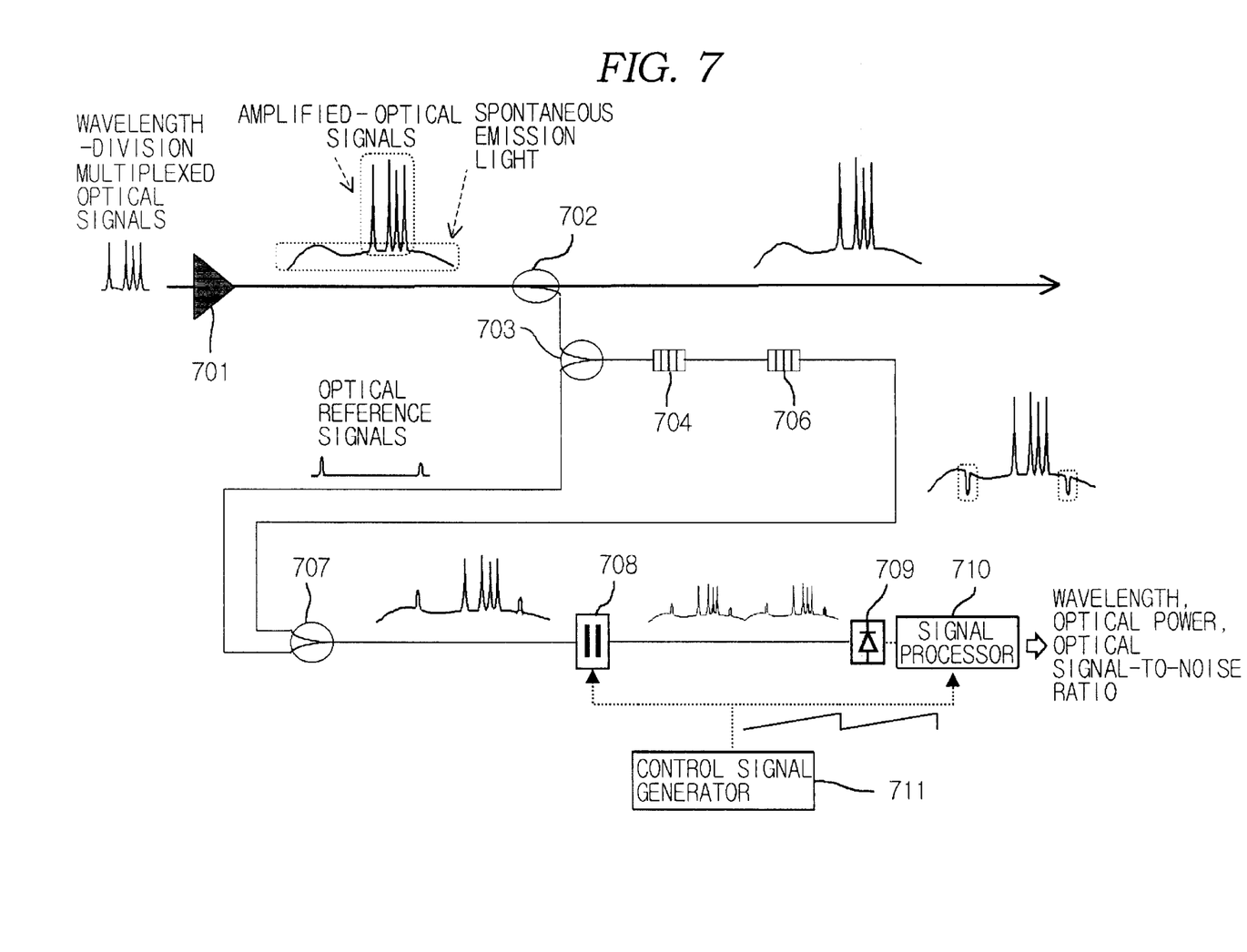
FIG. 7 is a diagram illustrating an apparatus for measuring wavelength, optical power, and OSNR of each optical signal in WDM optical communication according to the third embodiment of the present invention.

FIG. 7 is a diagram illustrating an apparatus for measuring the wavelength, optical power, and OSNR of each optical signal according to the third embodiment of the present invention.

The apparatus includes an optical amplifier 701, an 1×2 optical coupler 702, two 2×1 optical couplers 703, 707, two fiber bragg gratings 704, 706, an optical bandpass tunable filter 708, a photo-diode 709, a signal processor 710, and a control signal generator 711.

Since the optical amplifier 701 not only amplifies the wavelength-division-multiplexed optical signals, but also generates the spontaneous emission light simultaneously, the optical amplifier also performs a function of the spontaneous emission light source.

Each of the fiber bragg gratings 704, 706 reflects only the light of the specific wavelength that is determined by its own period of the gratings.

The apparatus according to the third embodiment of the present invention operates as follows.

First, the wavelength-division-multiplexed optical signals are supplied to the optical amplifier 701. The optical amplifier amplifies the wavelength-division-multiplexed optical signals and generates spontaneous emission light.

Both of the amplified optical signals and the spontaneous emission light are split by the 1×2 optical coupler 702 and supplied to the concatenated fiber bragg gratings 704, 706 through the 2×1 optical coupler 703.

As the reflection wavelength of each of fiber bragg gratings 704, 706 is predetermined to be outside the wavelengths of said wavelength-division-multiplexed optical signals, only the section of spontaneous emission light at the same wavelength as the reflection wavelength of each fiber bragg grating is reflected backward. Since the reflected light has the same wavelength as that of the fiber bragg grating, it can be used as the optical reference signal for reference wavelength in wavelength measurement.

The optical reference signals are split by the 2×1 optical coupler 703 and sent to the 2×1 optical coupler 707. Meanwhile, the optical signals passing through the fiber bragg gratings 704, 706 are also sent to the 2×1 optical coupler 707. The 2×1 optical coupler 707 combines said optical reference signals with said wavelength-division-multiplexed optical signals in asymmetric coupling ratio to make the optical reference signals remarkable in optical spectrum, and sends the combined light to the optical bandpass tunable filter 708.

Passband of the optical bandpass tunable filter 708 is controlled by the control signal issued from the control signal generator 711. The passband of the optical bandpass tunable filter in the embodiment of the present invention gets increasing in proportion to the amplitude of the control signal. The control signal generator 711 sends the control signal of ramp shape to the optical bandpass tunable filter 708. Consequently, the optical bandpass tunable filter 708 generates the same waveform as the optical spectrum of the combined light in which said optical reference signals generated by fiber bragg gratings 704, 706 and said wavelength-division-multiplexed optical signals are included. The photo-diode 709 converts said waveform into an electric signal.

The output electric signal of the photo-diode 709 and the control signal of ramp shape are sent to the signal processor 710. The signal processor 710 measures the optical power and OSNR of each of the wavelength-division-multiplexed optical signals by using the conventional methods.

The methods for measuring the wavelength, optical power, and OSNR of each of said wavelength-division-multiplexed optical signals using this apparatus is the same as those of the first and second embodiments of the invention as described above.

Figure 8A:
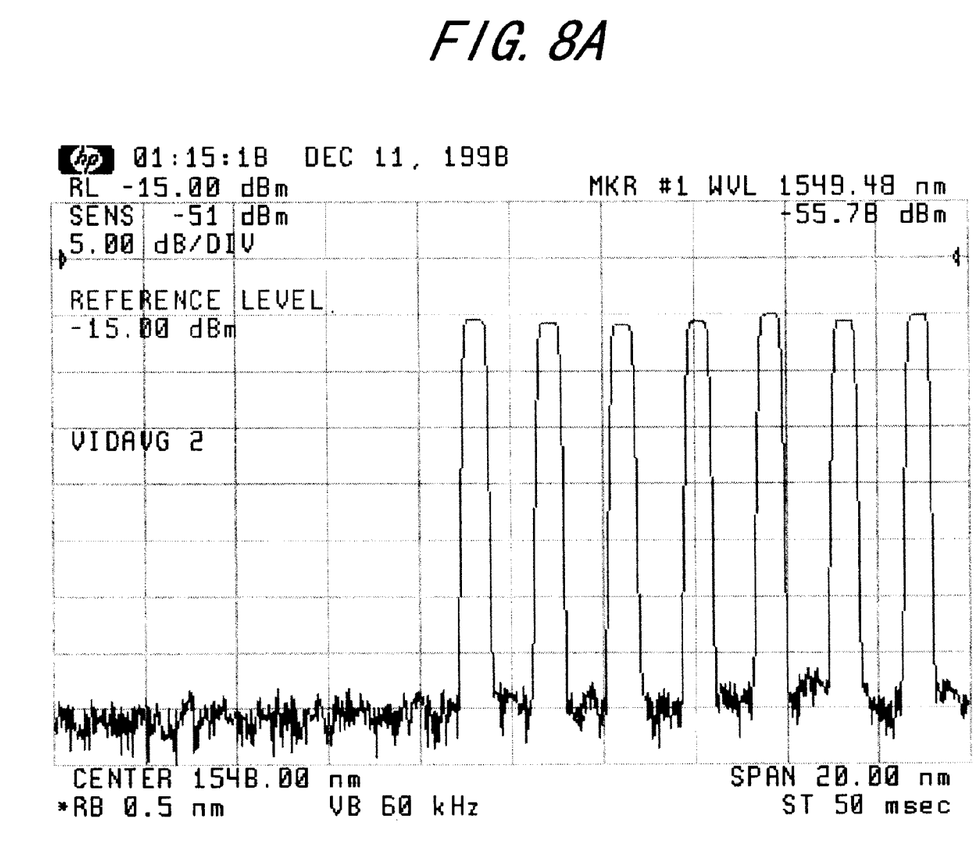
FIG. 8A is a screen image of the conventional optical spectrum analyzer illustrating the optical spectrum of seven optical signals used in the first embodiment of the present invention.
Figure 8B:
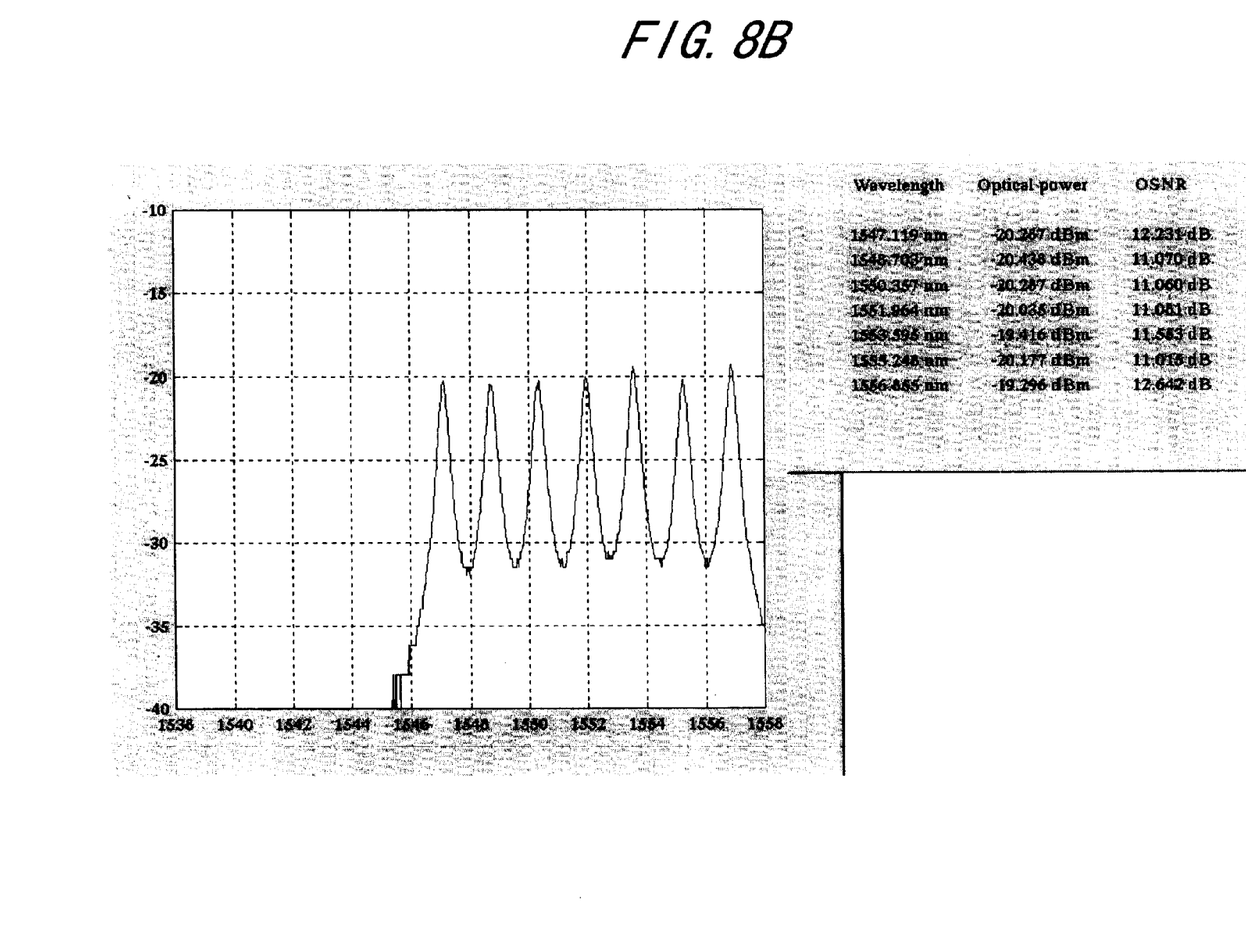
FIG. 8B is a graph illustrating the measured wavelengths, optical power, and OSNR of seven optical signals according to the first embodiment of the present invention.

FIG. 8A is a screen image on the conventional optical spectrum analyzer illustrating the optical spectrum of seven optical signals used in the first embodiment of the present invention. FIG. 8B is a graph illustrating the measured wavelengths, optical powers, and OSNRs of said seven optical signals according to the first embodiment of the present invention.

Since the apparatus according to the present invention doesn't require free-space alignment, problems in the conventional methods can be solved. In addition, complex Gaussian approximation based on the spatially discrete measurement is not performed. The wavelength measurement is not affected by the environmental changes such as temperature and humidity because the fiber bragg grating is very stable against them.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An apparatus for measuring a wavelength, optical power, and an optical signal-to-noise ratio (OSNR) of each optical signal in wavelength-division-multiplexing optical communication, comprising:
    means for splitting a part of wavelength-division-multiplexed (WDM) optical signals;
    means for amplifying said WDM optical signals and generating spontaneous emission light simultaneously;
    means for reflecting a predetermined section of said spontaneous emission light and generating an optical reference signal for a reference wavelength;
    means for combining said optical reference signal with the part of the WDM optical signals split by said splitting means and generating a combined light;
    means for filtering said combined light at a fixed temperature and generating a waveform which is the same as an optical spectrum of said combined light in a time domain;
    means for converting said waveform into an electric signal; and
    signal-processing means for measuring said wavelength, said optical power, and said OSNR of each of said WDM optical signals by employing said electric signal.

2. The apparatus of claim 1, further comprising:
    signal-generating means for generating control signal, wherein said control signal controls said means for filtering and said signal-processing means.

3. The apparatus of claim 1, further comprising:
    optically isolating means for passing the optical signal passing through said means for reflecting in uni-direction.

4. The apparatus of claim 1, wherein said means for amplifying is one of an erbium-doped fiber amplifier and a semiconductor optical amplifier.

5. The apparatus of claim 1, wherein said means for reflecting is one of a fiber bragg grating and an integrated optical device including grating.

6. The apparatus of claim 1, wherein said means for filtering is one of a tunable Fabry-Perot filter, an integrated optical device including grating, and a multi-layer thin film device.

7. The apparatus of claim 1, wherein said means for filtering is one of a tunable Fabry-Perot filter, an integrated optical device including grating, and a multi-layer thin film device.

8. An apparatus for measuring a wavelength, optical power, and an optical signal-to-noise ratio (OSNR) of each optical signal in wavelength-division-multiplexing optical communication, comprising:
    means for splitting a part of wavelength-division-multiplexed (WDM) optical signals;
    a spontaneous emission light source for generating spontaneous emission light;
    means for reflecting a predetermined section of said spontaneous emission light and generating an optical reference signal for a reference wavelength;
    means for combining said optical reference signal with the part of the WDM signals split by said splitting means and generating a combined light;
    means for filtering said combined light at a fixed temperature and generating a waveform which is the same as the optical spectrum of said combined light in a time domain;
    means for converting said waveform into an electric signal; and
    signal-processing means for measuring said wavelength, said optical power, and said OSNR of each of said WDM optical signals by employing said electric signal.

9. The apparatus of claim 8, further comprising:
    optically terminating means for terminating spontaneous emission light without any reflection of said spontaneous emission light passing through said means for reflecting.

10. The apparatus of claim 8, wherein said means for reflecting is one of a fiber bragg grating and an integrated optical device including grating.

11. The apparatus of claim 8, wherein said means for filtering is one of a tunable Fabry-Perot filter, an integrated optical device including grating, and a multi-layer thin film device.

12. The apparatus of claim 8, wherein said spontaneous emission light source is a light-emitting diode (LED).

13. The apparatus of claim 12, wherein said optical reference signal for reference wavelength is discerned by applying a driving current, which is sum of a constant current and an alternating current with specific frequency, into said LED.

14. The apparatus of claim 8, further comprising:
    signal-generating means for generating control signal, wherein said control signal controls said means for filtering and said signal-processing means.

15. An apparatus for measuring a wavelength, optical power, and an optical signal-to-noise ratio (OSNR) of each optical signal in wavelength-division-multiplexing optical communication, comprising:
    means for amplifying wavelength-division-multiplexed (WDM) optical signals and generating spontaneous emission light simultaneously;
    means for splitting a part of said WDM optical signals including said spontaneous emission light;
    means for reflecting a predetermined section of said spontaneous emission light and generating an optical reference signal for a reference wavelength;
    means for combining said optical reference signal for the reference wavelength with the part of the WDM optical signals split by said splitting means and generating a combined light;
    means for filtering said combined light at a fixed temperature and generating a waveform which is the same as an optical spectrum of said combined light in a time domain;

means for converting said waveform into an electric signal; and signal-processing means for measuring said wavelength, said optical power, and said OSNR of each of said WDM signals by employing said electric signal.

16. The apparatus of claim 15, wherein said means for amplifying is one of an erbium-doped fiber amplifier and a semiconductor optical amplifier.

17. The apparatus of claim 15, wherein said means for reflecting is one of a fiber bragg grating and an integrated optical device including grating.

18. The apparatus of claim 15, further comprising:

signal-generating means for generating control signal, wherein said control signal controls said means for filtering and said signal-processing means.

\* \* \* \* \*